2,958,706

**PROCESS FOR PREPARATION OF PENTAERYTH-
RITOL AND POLYPENTAERYTHRITOL ESTER
PLASTICIZERS**

Marvin J. Hurwitz, Elkins Park, Paul M. Zorn, Jr., Trevose, and Andrew M. Craig, Jr., Philadelphia, Pa., assignors to Rohm & Haas Company, Philadelphia, Pa., a corporation of Delaware No Drawing. Filed Feb. 28, 1958, Ser. No. 718,125

16 Claims. (Cl. 260—488)

This invention deals with esters of pentaerythritols. More particularly, this invention relates to an improved preparation of esters of pentaerythritols and a definite class of aliphatic monocarboxylic saturated acids by an esterification process which includes subjecting an esterification reaction mixture to a concurrent treatment of an activated finely divided charcoal, elevated temperatures and low pressures. This invention also deals with the resulting pentaerythritol esters which are plasticizers for resinous compositions and which impart to those resinous compositions remarkable electrical properties as well as more than satisfactory physical and mechanical properties. This invention also relates to the polyvinyl halide compositions plasticized with this limited group of esters.

In recent years, there has been an increasing demand for high standard insulating and sheeting resinous coating for industrial electrical conductors, such as power cables and industrial tool and machine wiring. Important desirable properties of such resinous insulators include high electrical resistance for operation without loss of power under conditions of dry and/or moist high temperatures. Quite commonly, these insulators are made of vinyl resins, in particular of polyvinyl halides such as polyvinyl chloride which are plasticized and stabilized. It is suspected that electrical properties of resinous insulators are markedly influenced by the nature and properties of the plasticizers. In view of these facts, it has been found necessary in industrial electrical application not only to select a proper plasticizer judiciously, but also to treat or prepare the plasticizer with the purpose of improving its general mechanical and chemical characteristics as well as its electrical properties.

Conventional type of plasticizers which are employed in resinous insulators are dialkyl phthalates, more especially the dioctylphthalates. In a further search for improved plasticizers having satisfactory general properties and high electrical resistivity, attention has centered on some esters of the pentaerythritols. A pentaerythritol dibutyrate dicaprylate having a proportion of unesterified hydroxyl groups has been suggested to improve electrical insulation. More recently, a restricted group of branched esters of dipentaerythritols has been discovered which provides quite satisfactory plasticizers. However, in accordance with our invention, even their esters may be further improved.

A review of various methods which have been suggested in the literature to improve the general and electrical properties of high molecular weight plasticizing esters discloses an attempt to deodorize and to purify dialkylphthalates by a vacuum, heat, and steam treatment. Another procedure decreases objectionable odors in phthalates by heating them in the presence of a saturated alkyl petroleum hydrocarbon. Further attempts to reduce objectionable color also have been made by neutralizing and washing the ester product in the presence of activated charcoal. In these and similar conventional procedures, activated charcoal in large amounts or decolorizing clays are employed on the collected ester product and generally only after removal of excess acid. It was generally thought that the process of producing the plasticizing esters has no influence in improving their electrical properties. More particularly, with respect to improving the electrical resistivity of dialkylphthalates, it has been suggested to treat them with alumina while heating. However, such stratagems are not satisfactory in improving the general properties along with the electric properties of the esters of dipentaerythritol with which we are here concerned.

Unexpectedly, we have found that an activated charcoal of a particular kind has a singular beneficial effect when it is employed while esterifying defined polyols with acids specified below and concurrently applying conditions of high temperatures and reduced pressures. There appears to be a beneficial inter-relationship between the effects applied under the conditions of this invention so that the resulting esters have unexpected valuable properties as plasticizers for resinous compositions.

A preferred aspect of our invention comprises reacting pentaerythritols and acid, both being further defined hereinafter, by heating in the presence of each other, subjecting the reaction mixture containing excess acid concurrently to conditions of high vacuum, high temperatures and to the effect of a neutral activated charcoal. As the treatment proceeds, excess acid is removed and at the end there is obtained an ester product which is an excellent plasticizer. A singular beneficial effect of our process is that the resulting plasticizer also has remarkable electrical properties. The plasticizing esters resulting from our process have an acid number preferably not exceeding 0.2, more desirably in the range of about 0.1 to about 0.05 and most advantageously an acid number as low as in the range of about 0.05 to about 0. The color of the plasticizing ester product may be quite low as about 2 and preferably less than about 1 on the Gardner (1933) Color Scale. Alternatively, the final color of the product may be as low as in the range of about 150 to about 5 on the American Public Health Association (APHA) scale and preferably in the range of 5 to 10 and even more desirably, not exceeding 5 on that scale.

In accordance with our invention, we have found that our improved esterification process is most advantageously applied to prepare esters of pentaerythritols, particularly of dipentaerythritol and saturated aliphatic straight or branched chain monocarboxylic acids which are further defined below.

Polypentaerythritols are those alcohols which are higher derivatives of pentaerythritol and which are formed by etherification of one or more hydroxyl groups of pentaerythritol with other pentaerythritol residues. Polypentaerythritols include dipentaerythritol, tripentaerythritol, tetrapentaerythritol, pentapentaerythritol, heptapentaerythritol, octapentaerythritol, nonapentaerythritol, decapentaerythritol, similar higher pentaerythritols, and mixtures thereof. Polypentaerythritol esters are esterification products of the above polypentaerythritols. Pentaerythritols and polypentaerythritols which are esterified with at least one of the particular monocarboxylic aliphatic saturated acids defined below may be represented by the following Formula I

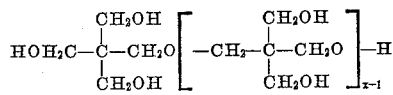

where $x$ equals 1 to 14 with (a) a special situation where $x$ equals from 1 to 3 and (b) the cases where $x$ equals from 1 to above 3 but in a mixture in which the average value of $x$ is not over 3. Since averages are dealt with, the value of $x-1$ may be a fraction or a mixed number as well as an integral number. The situation where $x$ equals 2 is preferred, and in such a situation we are dealing with dipentaerythritols or as will be explained further below with mixtures of pentaerythritols having a major component of dipentaerythritol.

The preparation of various polypentaerythritols which are used herein is known. Such illustrative methods are found in U.S. Patent Nos. 2,462,049, and 2,552,532 and in British Patent Nos. 757,564 and 615,370. Pentaerythritols and various polypentaerythritols such as dipentaerythritol and tripentaerythritol also are known and commercially available. So are mixtures of various lower pentaerythritols such as pentaerythritol with dipentaerythritol and/or tripentaerythritol or mixtures of the latter two. In accordance with this invention, these polyols may be used singly or, often because of their commercial availability, in mixtures containing various amounts of at least two such polyols such as pentaerythritol, dipentaerythritol, and tripentaerythritol. There may also be used in accordance with this invention mixtures of polypentaerythritols containing higher polypentaerythritols mixed with pentaerythritol and with lower polypentaerythritols. For instance, "Polypentek" Heyden Chemical Corporation is stated to be a mixed polypentaerythritol containing pentaerythritol and higher etherification derivatives thereof averaging out to tripentaerythritol.

A mixture of polyols preferred at the present time is a mixture of pentaerythritols containing a major proportion i.e. at least 85% and preferably about 90% of dipentaerythritol, the remainder being pentaerythritol and/or polypentaerythritols of higher molecular weight than dipentaerythritol. Another mixture of polymer of special value is one containing at least 85% and preferably about 90% of tripentaerythritol, the remainder being lower molecular pentaerythritols and some high molecular weight polypentaerythritols.

In accordance with our invention, we react the above-defined pentaerythritols with fatty acids having an individual carbon atom content of 4 to 8. When mixtures of these fatty acids are employed, the average carbon atom content is 5 to 6.5. When the fatty acids are employed singly, we favor using a branched fatty acid containing six carbon atoms.

The useful mixtures of fatty acids, having the specified individual and average carbon contents, contain from about 50 to about 100% by weight of branched acid component to the total acid mixture. In this invention, by branching there is meant that the acid moiety of the final ester or the defined fatty acids, whether used individually or in mixtures, are substituted in the 2- and/or 3-position, preferably in the 2-position by a lower alkyl group, preferably a methyl and/or ethyl group.

When in accordance with our process, the selected acids are reacted with the above-defined polyols, there results plasticizing esters having excellent mechanical and chemical, as well as electrical properties, and particularly excellent electrical resistivity.

Since the electrical resistivity of a plasticized resinous composition such as plasticized polyvinyl chloride is dependent upon the formulation including the amount of plasticizer and proportions of filler, a standard formulation has been adapted for the purpose of this invention. In such standard formulations, the electrical resistivity of the esters obtained by our process may range from a minimum of high resistivity of about $0.5 \times 10^{12}$ ohms/cm., preferably about $1.0 \times 10^{12}$ ohms/cm. to about $20 \times 10^{12}$ ohms/cm. and occasionally to about $100 \times 10^{12}$ ohms/cm. These electrical resistivity values are statistical sampling of a large number of specimens tested under standard wet test conditions at 60° C. and under standard dry test conditions at 90° C.

Illustrative of the monocarboxylic saturated aliphatic acids that may be employed in the present invention, there may be named (a) straight chain acids such as
butyric valeric caproic
heptanoic caprylic (b) branched chain acids such as
2-ethylhexanoic 4-methylpentanoic
2-methylpentanoic 2-methylpropionic
2-methylhexanoic 3-ethylpentanoic
3-methylbutyric 3-methylhexanoic
3-methylpentanoic 2-methylbutyric
3-ethylhexanoic 2,2-dimethylpropionic
3,3-dimethylbutyric 2,3-dimethylbutyric
2-ethylbutyric 2-ethyl-2-methylbutyric
2-ethylpentanoic 2-ethyl-4-methylpentanoic
2-methyl-3-ethylpentanoic 2,2,3,3-tetramethylbutyric
2,2-dimethylbutyric 2-isopropylpentanoic
2-ethyl-3-methylbutyric 2-isopropyl-3-methylbutyric As described above, the term "average carbon atom content" is employed for characterizing a mixture of esterifying acids. The average carbon atom content of acids is obtained by multiplying the carbon atom content of an individual acid by the mole fraction in which that acid is employed in a particular esterifying mixture and totaling the numerical products so obtained. It should be understood that in the present invention, including the claims, the term "acid" is meant to include the term "acid residues" or "acid moieties" when reference is made to the acid component of the final plasticizing ester. In Table I, there is shown how to compute an average carbon content for a typical useful acid mixture. In accordance, by a similar computation, there is obtained the average carbon content of the acid moieties of the finished ester products.

TABLE I

Computation of an average carbon atom content of a mixture of acids

| Acids | (1) Individual Carbon Atom Content | (2) Mole Fraction Employed | (3) Product of (1) by (2) |
|---|---|---|---|
| Valeric | 5 | 0.329 | 1.645 |
| 4-methylpentanoic | 6 | 0.29 | 1.74 |
| 2-ethylbutyric | 6 | 0.231 | 1.39 |
| heptanoic | 7 | 0.15 | 1.05 |
| Average Carbon Atom Content of mixture (I) | | | 5.825 |

In accordance with this invention, after having selected the proper acid or mixture of acids, the above defined polyols are reacted by heating together with the defined acid or acid mixture under conditions favoring esterification. During the process, an esterification reaction mixture containing excess acid is subjected to the effect of an activated carbon under high temperature and high vacuum under conditions favoring stripping of excess acid. The concomitant effect of a defined type of activated carbon, initially high and then decreasing amounts of free acid in the reaction mixture, reduced pressure and elevated temperatures all contribute in an important manner to the success obtained by our method.

In accordance with our process, there may be employed any suitable proportion of reactants to initiate esterification. Since, however, all hydroxyl groups of the polyols should ultimately be esterified, the esters of this invention may be prepared by either a stoichiometric esterification followed by further esterification with acid or by an esterification in which there is employed an initial amount of excess acid.

A preferred manner of reacting the defined polyols and at least one suitable acid is to employ molar excess of the single acid or molar excess of an appropriate mixture thereof over the amount of polyol employed. The excess acid may be added as the esterification reaction proceeds but preferably it is added initially. There may be used, if desired, no excess or as little as 5%, or as much as a 200% excess or more upon a molar basis. Very conveniently there is employed about 5 to 15% excess by weight over the polyol and even more conveniently about 10% excess acid by weight over the polyol employed. This excess promotes the reaction and its presence is required at the outset when carbon, low pressures and high temperatures are concurrently applied.

Esterification is conveniently carried out under reflux at elevated temperatures in the region of about 120° to 260° C. Temperatures in the higher ranges as above about 240° to 260° C. should be avoided particularly if tending to cause pyrolysis of the resulting ester. Generally, satisfactory results obtain at a temperature range of about 150° to 240° C. and more particularly in the range of 180° to 220° C. As heating is continued, reflux starts usually at about 140° C. dependent in part on the reactants and solvent if one is included.

Reflux is continued and water is carried over. As the quantity of water in the reaction mass is continuously removed, the temperature of the batch increases from about 150° to 240° C. or more. After the theoretical amount of water has been removed, heating may be discontinued. Preferably, heating is carried out until the hydroxyl number is below 5, preferably in the range of 1.0 to 0 or until the acid number remains essentially constant at a constant pressure. The desired range of hydroxyl number is generally reached in 3 to 48 hours.

If desired, but not necessarily, there may be employed with esterification acid or acids, a water entrainer such as a light hydrocarbon fraction having an aqueous azeotrope. Catalysts of reactions are not required and it usually is desirable to operate without them.

When the reaction product is substantially free of unesterified alcohol, that is, when the hydroxyl group is about 5 to 0 and preferably from about 1.0 to about 0 and more especially when the hydroxyl number is about 0, the acid reaction mixture is subjected to the simultaneous effect of high temperatures, and high vacuum to promote removal of excess unreacted esterifying acid or mixtures thereof, in the presence of a defined activated carbon. At that time, the reaction mixture, substantially free of unesterified alcohol, contains excess acid. There may be present excess acid from as little as 1% to 80% but preferably about 10% on the basis of the esterified ester present.

The type of carbon which we have found useful in our invention includes activated charcoals and carbons often named clarifying, decoloring carbons and the like. Generally, these are vegetable charcoal of commerce. For best effects, it is desirable to employ an activated carbon of a density and size allowing optimum contact with the reaction mixture that is being treated such as one of low density and soft type. Preferably, the activated charcoal is initially neutral, i.e. when dispersed in water, the water is found to have a pH within the range of about 6.0 to 8.0, and preferably about 7.0. The particle size of the carbon may range over a very wide range, as in the range of 4 to 200; for best results finely divided activated carbon, as below 100 mesh granular carbon, are being preferred. Illustrative sources from which activated carbon has been prepared are primary wood materials such as pine wood charcoal, wool wood charcoal (Bragg's charcoal), poplar wood charcoal (carbon belloc) and rice-hull charcoal (Carbrox). Other charcoals may be prepared by treatment with activating gases at high temperatures from carbonized materials such as from sulfite cellulose waste, wood charcoal and peat. Activated carbons are common articles of commerce.

There may be used relatively small amounts of activated carbon. Sometimes, as little as 0.01% by weight of the starting reaction mixture of acids and polyol may have some effect. Generally, as little as 0.5 to 5% by weight is quite satisfactory, and specially 1% by weight of the starting reacting mixture is a convenient and effective proportion. In amounts in excess of 5% such as 10% or even higher, practical handling difficulties may be encountered.

In accordance with our invention, the finely divided activated charcoal should be contacted with the reactants at least by the time when they are substantially free of unesterified alcohol i.e. when the hydroxyl number has reached the specified low range from about 5 to about 0 and prior to the concurrent application of vacuum, high temperatures and removal of excess acid. If desired, the activated charcoal may be mixed with the esterifying reactants at the outset of the esterification and esterification is carried out in the presence of the activated carbon. When the specified hydroxyl number range is reached, low pressures may then be applied while the temperature is adjusted and/or maintained within the prescribed limits. Alternatively, low pressures may be applied until the specified range is obtained and then the temperature may be raised to within the prescribed range. Generally, as low pressures are applied to within the specified range, the temperature is gradually maintained or increased to within the prescribed range. Upon lowering of the pressures, the excess acids present in the reaction mixture distill off.

However, instead of introducing all or part of the activated carbon at the outset or during esterification, we now prefer to contact the carbon with the acid esterification reaction mixture at about the time when the hydroxyl number does not exceed about 1.0 and prior to the time when elevated temperatures and low vacuum are concurrently applied.

The temperature at which activated carbon is introduced may widely vary. It is determined by practical consideration. It may be as low as 20° C. or lower or as high as 240° C. For convenience, we prefer to add the carbon at a temperature of about 100° to 120° C.

To bring out the unusual results of our invention, it is necessary that concurrently while contacting activated carbon, there be applied reduced pressures preferably not higher than 80 millimeters of mercury absolute. There is a special advantage in operating at pressures under that and no higher than about 50/mm., and exceptionally beneficial to operate as low as in the range of about 10 mm. to about 0 mm. of mercury. Very good results are obtained by operating in the range of 1 or better 0.5 to 2 mm. The reduced pressures may advisably be adjusted depending on the excess esterifying reactant being stripped off and depending on the progress of the reaction.

As low pressures are applied and jointly with effect of activated carbon, the temperature of the reaction mixture is maintained at elevated temperatures. Advisedly, the temperature is kept below the boiling point of the ester product under the vacuum used and below the decomposition point of the reactants, or the desired product or usually not exceeding 240° C., but sometimes higher. The approach of the upper limit of the temperature of decomposition can usually be detected by a darkening of the reaction mixture. If any tendency to darken is observed, the temperature should be reduced until darkening decreases. Generally, very satisfactory results follow by not exceeding 240° C. and by operating in the range of about 150° C. to about 240° C. preferably in the range of 180° to 220° C. and especially in the range at about 200° C.

The duration of the combined application of the effects of high temperatures, low pressures and activated carbon depends on the nature of the individual reaction mixture which is being treated, particularly the amount and type of excess esterifying reactant, the fineness and amount of activated carbon, the temperatures at which the reaction mixture is maintained, the pressure applied and the purity desired of the final plasticizing ester. The higher the vacuum and temperatures, and the lower the molecular weight of the esterifying reactant stripped, the shorter the duration of the treatment. The progress of the reaction may be followed by tapping test samples from a suitable outlet on the vessel holding the reacting mixture. The treatment may be discontinued when the acid number is not exceeding about 0.5 but for best results in accordance with our invention, is preferably discontinued when the acid number of the ester product is not exceeding 0.1. Generally, outstanding esters are obtained upon discontinuing treating when the acid number reached is between about 0.1 to about 0.05 and even more desirable products are obtained when the acid number ranges from about 0.02 to about zero. Normally, the range of acid number in the product may be reached, in accordance with our invention, in less than ten hours, often in about 2 to 4 hours. Upon satisfactory conclusion of the triple effect of reduced pressure, heat and carbon, heating is discontinued, vacuum is released and the ester allowed to cool. The ester is separated from the carbon by a convenient technique, conveniently by filtration in the presence of a filter aid.

The process of this invention may be carried out either in batch-wise, continuous, or intermittent manner. The described operations may be carried out in suitable reactor, preferably one having an inner surface relatively resistant to the reactants and the products thereof, such as glass, stainless steel, porcelain, ceramic, and the like.

The defined esters of pentaerythritols are useful as lubricants, stabilizers, pour-point depressants. Of even greater interest is the use of the defined esters of pentaerythritols as plasticizers for resinous compositions, particularly for chloro nitrile rubber and halogen containing vinyl resins. The vinyl resins generally employed in the practice of the present invention may comprise either a homopolymer of vinyl halide, for example polyvinyl chloride, polyvinylidene chloride, and the like, or mixtures of vinyl halides such as vinyl chloride, vinyledene chloride, and the like with each other or mixtures of one or both with minor proportions of other monomers, copolymerizable therewith as for instance, vinylacetate, vinylpropionate, vinylbutyrate, methyl methacrylate, and other similar acceptable materials containing a vinyl group, $CH_2=CH-$. Preferably, the chlorine containing vinyl copolymers plasticized in accordance with this invention, contain a predominant quantity of the monomeric units as vinyl chloride units. Particularly preferred copolymers and polymers are vinyl chloride polymers having from 80% to 100% vinyl chloride units. Such compositions include a copolymer of vinyl chloride, vinyl acetate in which the vinyl acetate comprises from about 1% to 20% of the total weight of the vinyl ester and the vinyl chloride.

The amount of plasticizing ester to be incorporated within the halogen polymers may vary over a considerable range depending upon whether these plasticizing esters are used as primary plasticizers alone or as secondary plasticizers in conjunction with other conventional plasticizers. The amount also depends on the proportion of vinyl chloride polymer used and particularly with the intended use of the plasticized compositions. When it is desired to prepare fairly rigid articles, the amount of plasticizing ester may vary from about 5 to 50 parts per 100 parts of polymer. About 20 to about 40 parts of plasticizing ester, as primary plasticizer, per 100 parts of final plasticized polymer and particularly about 35 to 40 parts per 100 parts of final plasticized polymer, are exceptionally satisfactory combinations for polymeric compositions to be used in electrical applications. The plasticizing esters of this invention may also be used as secondary plasticizers in conjunction with other conventional plasticizers such as dibutyl phthalate, di-n-decyl phthalate, other esters of polyols, 2-ethylhexyl phthalates and the like. They may also be employed, if desired, in combination with antioxidants such as, for example, phosphites, amines, phenols, and the like. The antioxidants are generally employed in amounts varying from about 0.1 to about 0.3% by weight of the material to be stabilized. Various pigments, colors, fillers, and polymer stabilizers may also be added to these compositions.

The polymers are compounded by means of conventional equipment, such as mills of the heated roll type, or internal mixers. The plasticizer and other compounding ingredients, such as fillers and stabilizers, are worked into the resin so that they are thoroughly dispersed therein by means of such equipment, and the resulting compositions are then molded, calendered, extruded, formed into articles of desired shape by conventional procedure, or applied on electrical conductors by extrusion over the wire conductors. In such applications, the plasticizing esters of this invention preferably make up at least 25% of the total amount of plasticizer.

A practical range of ingredients, which may be used in the practice of the present invention and on which electrical tests may conveniently be run, is given below.

Ingredients: Parts by weight
Vinyl chloride resin (polyvinyl chloride) _____ 65
Plasticizer _____ 35
Tribase (lead tribasic lead sulfate) _____ 5
No. 33 clay _____ 15
Paraffin wax _____ 0.3

The above formulation is cut and molded into a standard 4 cavity ASTM mold to give specimens of 6" x 6" approximately 0.75" thick. Various typical specimens are tested for electrical properties and particularly for their insulation resistance. In these standard tests, the specimens are subjected to (a) a temperature of 25° C. and 50% relative humidity, (b) a temperature of 90° C. and 50% relative humidity, (c) a temperature of 60° C. after immersion for 20 hours in water heated to 60° C., and (d) a temperature of 75° C. after immersion for one day, one, four, and eight weeks at 75° C.

The electrical properties of the plasticizing esters of this invention are compared with those of specimens plasticized with diisodecylphthalate, di-n-decylphthalate, 2-ethylhexylphthalate and other electrical grade conventional plasticizers.

The polyvinyl halide resinous compositions are tested for their mechanical, electrical, and chemical properties by submitting selected specimens to standard activated carbon volatility tests, Gasoline Extraction, Soap and Detergent Water Extraction, Shore Hardness, as well as stability to degradation by ultraviolet light. Stability upon exposure to heat is also determined. The resinous compositions are found to have very satisfactory chemical and mechanical properties.

The improvements for electrical properties obtained by plasticizing polyvinyl compositions with typical esters made in accordance with our invention are shown in Tables II and III below. The other esters of this invention of pentaerythritols and of the specified mixture of fatty acids or of a single branched fatty acid containing 6 carbon atoms perform in an equivalent manner.

TABLE II

*A comparison of electrical properties of plasticized polyvinyl chloride compositions*

| Ester | Volume Resistivity [1], ohm/cm. | | | |
|---|---|---|---|---|
| | 90° C. Dry | | 60° C. Wet | |
| | Made without C treatment | Made with C treatment | Made without C treatment | Made with C treatment |
| Dipentaerythritol hexa-2-methyl-pentanoate | 0.6×10$^{12}$ | 6.5×10$^{12}$ | 1.0×10$^{12}$ | 13.8×10$^{12}$ |
| Dipentaerythritol hexa-2-ethylbutyrate | 1.0×10$^{12}$ | 12.5×10$^{12}$ | 1.2×10$^{12}$ | 25.5×10$^{12}$ |
| Dipentaerythritol n-hexanoate/2-methylpentanoate/3-methylpentanoate in a 30/30/40 weight ratio | 0.4×10$^{12}$ | 9.8×10$^{12}$ | 0.8×10$^{12}$ | 14.7×10$^{12}$ |
| Dipentaerythritol tetra-2-methylbutyrate dicaprylate | 1.1×10$^{12}$ | 4.2×10$^{12}$ | 0.2×10$^{12}$ | 8.4×10$^{12}$ |

C Treatment=Carbon treatment in accordance with this invention.
[1] *Volume Resistivity Test*—The procedure followed in this test is fully described in "Rubber Age," April 1946, pages 105 to 108, by C. E. Balmer and R. F. Conyne and in "Resin Review," Rohm & Haas Company, vol. 6, pages 3 to 9.

TABLE III

*Electrical properties of esters prepared by the process described*

| Ester | Volume Resistivity [1], ohm/cm., Tested at— | |
|---|---|---|
| | 90° C. Dry | 60° C. Wet |
| Dipentaerythritol tetra-2-methylbutyrate dicaprylate | 3.2×10$^{12}$ | 7.7×10$^{12}$ |
| Pentaerythritol 2-methylbutyrate/caprylate in a 61.7/38.3 weight ratio | 4.5×10$^{12}$ | 10.0×10$^{12}$ |
| Mixture of mono-, di-, and poly-pentaerythritols averaging to tripentaerythritol 2-methylbutyrate/caprylate in a 61.7/38.3 weight ratio | 3.4×10$^{12}$ | 8.2×10$^{12}$ |
| Dipentaerythritol hexa-2-methylpentanoate | 5.3×10$^{12}$ | 9.9×10$^{12}$ |
| Pentaerythritol tetra-2-methylpentanoate | 5.0×10$^{12}$ | 9.0×10$^{12}$ |
| Tripentaerythritol octa-2-methylpentanoate | 7.1×10$^{12}$ | 12.5×10$^{12}$ |
| Dipentaerythritol hexa-2-ethylbutyrate | 13.4×10$^{12}$ | 34.6×10$^{12}$ |
| Pentaerythritol tetra-2-ethylbutyrate | 11.9×10$^{12}$ | 21.2×10$^{12}$ |
| Tripentaerythritol octa-2-ethylbutyrate | 16.4×10$^{12}$ | 26.4×10$^{12}$ |
| Mixture of mono-, di-, and poly- pentaerythritols averaging to tripentaerythritol octa-2-methylpentanoate | 5.5×10$^{12}$ | 9.8×10$^{12}$ |
| Dipentaerythritol tetra-2-methylbutyrate di-2-ethyl-4-methylpentanoate | 10.5×10$^{12}$ | 25.0×10$^{12}$ |
| Mixture of mono-, di-, and poly-pentaerythritols averaging dipentaerythritol 2-methylpentanoate | 4.9×10$^{12}$ | 7.8×10$^{12}$ |
| Dipentaerythritol n-hexanoate/2-methylpentanoate/3-methylpentanoate in a 30/30/40 weight ratio | 5.9×10$^{12}$ | 11.4×10$^{12}$ |

To further instruct one skilled in the art in the practice of our invention, we provide the following examples by way of illustration and not by way of limitation. All parts are by weight.

EXAMPLE 1

In a reaction flask equipped with a stirrer, distillation column, thermometer, receiver and with a heating jacket, there are introduced 290 parts of isobutyric acid, 127 parts of n-hexanoic acid, and 255 parts of 2-ethylbutyric acid, and 254 parts of dipentaerythritol. The mixture is heated at 200° C. for thirty hours. There is collected a total of 108 parts of distillate. At that time, when the hydroxyl number is 0.5, the reaction mass is cooled to 120° C. and there is added with mixing, 20 parts of activated charcoal. To the mixture, there is concurrently applied heating in the range of 200° to 210° C. and a pressure of 0.1 to 0.2 mm. of mercury. Mixture of excess acids are stripped off. After four hours, when the acid number is found to be 0.02, the batch is vented, heating is discontinued and the final product ester is collected by filtration.

EXAMPLE 2

A mixture of 454.6 parts of 2-methylpentanoic acid, and 150.7 parts of dipentaerythritol is gradually heated to and within a range of 190° to 200° C. at atmospheric pressure while a total of 64.8 parts of water of esterification is collected. At the end of 36 hours, the hydroxyl number is 1.0. The mixture is allowed to cool to about 100° C. and 30 parts of activated finely divided charcoal are added. Vacuum is applied to reach and hold a pressure of 2 to 3 mm. of mercury while concurrently heating is applied to raise and hold the temperature within the range of 200° to 210° C. for 3 hours. The acid is stripped off until the product has an acid number of 0.03. Heating is discontinued; vacuum is released and the batch is allowed to cool. To the product there is added 0.2% of a filtering agent and after 10 minutes of agitation the product is filtered free of activated carbon and filter aid. The collected hexa(2-methylpentanoate)-dipentaerythritol ester has an acid number of 0.025.

Essentially the same product is obtained when the activated carbon is introduced at the outset of the esterification.

EXAMPLE 3

A mixture of 454.6 parts of 2-ethylbutyric acid and 150.7 parts of dipentaerythritol is gradually heated to 230° C. and at atmospheric pressure for a total distillation time of 31 hours during which a total of 64.8 parts of water are distilled off. The batch is then cooled and 10 parts of activated finely divided charcoal are added. Vacuum is applied to reach and hold a pressure of 0 to 0.2 mm. of mercury and heating is applied to maintain a temperature within the range of 200° to 210° C. At the end of 5½ hours, the acid, number of the filtered sample is 0.05. The batch is cooled and vented. The collected ester has an acid number of 0.05.

EXAMPLE 4

In a similar manner as in Example 3, there is prepared the ester of 2-ethylbutyric acid and 228 parts of dipentaerythritol, 15 parts of monopentaerythritol and 7 parts of tripentaerythritol. The collected ester has an acid number of 0.02 and excels as a plasticizer.

EXAMPLE 5

In a reaction flask there is mixed 372 parts of tripentaerythritol and 1,021 parts of 2-methylpentanoic acid. The mixture is gradually heated to and maintained at the range of 180° to 220° C. for 26 hours. Water is distilled off. When the product has a hydroxyl number of 2, there is mixed thereto at a temperature of 102° C. 15 parts of activated carbon. The mixture is then heated in the range of 180° to 200° C. for 3 hours while concurrently the pressure is reduced to 1 to 5 mm. of mercury. Excess acid is stripped off. The ester is collected as described in the previous examples.

EXAMPLE 6

372 parts of a commercial mixture of monopentaerythritol, dipentaerythritol and polypentaerythritols, including tripentaerythritol and others higher than tripentaerythritol and averaging to tripentaerythritol is mixed with 599 parts of 2-methylbutyric acid and 423 parts of caprylic acid. The mixture is gradually heated to and at 220° to 240° C. for 30 hours, during which time water is distilled off. The batch, having a hydroxyl number of 1, is then cooled to about 100° C. and 8 parts of activated carbon are mixed with the reactants, heating is resumed and maintained within the range of 200° to 240° C. while concurrently the pressure is reduced to 10 to 13 mm. of mercury. After 6½ hours, a filtered sample has an acid number of 0.02. Heating is discontinued, the flask is vented and the ester collected

EXAMPLE 7

In a reaction vessel there are mixed 136 parts of pentaerythritol, 510 parts of ethylbutyric acid and 15 parts of activated carbon. Heating is applied for 25 hours. Vacuum is then applied to within the range of 0.05 mm. of mercury, while the temperature is maintained at 150° C. for 20 hours. Excess acid is stripped off and the product is collected having the acid number of 0.03.

In a similar manner, 1,024 parts of 2-methylpentanoic acid are reacted with pentaerythritol to yield the corresponding ester.

EXAMPLE 8

To a flask equipped with a stirrer, heating means, distillation column, and a receiver, there are added a mixture of 449 parts of 2-methylbutyric acid and 317 parts of 2-ethyl-4-methylpentanoic acid with 254 parts of dipentaerythritol. This mixture is gradually heated to 150° C. at atmospheric pressure for a total of sixty hours during which time 108 parts of water of distillation is collected in the receiver. The hydroxyl number is 0.1. The reaction mixture is cooled to about 100° C. and there are added to it with mixing 16 parts of activated charcoal. Vacuum is applied to 0.1 to 0.5 mm. of mercury for four hours during which time excess acid is stripped. When the acid number reaches 0.56, heating is discontinued and the batch is vented. The product is collected by separating it from the charcoal.

EXAMPLE 9

In a similar manner 100 parts of n-pentanoic acid, 100 parts of isovaleric acid, 249 parts of 2-methylbutyric acid and 317 parts of 2-ethylhexanoic acid are employed to esterify 254 parts of dipentaerythritol in the presence of 8 parts of activated charcoal. The temperature is maintained within the range of 180° to 200° C. during esterification and subsequently, when vacuum is applied to 0.5 ml. of mercury absolute. Acids are stripped off until the acid number reaches 0.65. Heating is discontinued and the system is vented. The ester collected by filtration has an acid number of 0.65.

EXAMPLE 10

In a similar manner, there is prepared an ester from 254 parts of dipentaerythritol, 269 parts of 2-methylbutyric acid, 180 parts of n-pentanoic acid and 317 parts of 2-ethylhexanoic acid. The final ester has an acid number of 0.3.

EXAMPLE 11

In a reaction flask there is mixed 254 parts of dipentaerythritol and 330 parts of isovaleric acid, 158.4 parts of n-caprylic acid, and 316 parts of 2-ethylhexanoic acid. The mixture is heated to within the range of 210° to 240° C. until the hydroxyl number is 0.2. The mixture is allowed to cool and 10 parts of activated carbon are added. The pressure is then reduced to 0.1 mm. and maintained within the range of 0.5 to 0.1. Excess acids start coming off as the pressure approaches the minimum values. Heating is applied and maintained at 190° to 200° C. for three hours. The collected ester has a number of 0.01.

EXAMPLE 12

In the reaction vessel, there are charged 145.2 parts of n-butyric acid, 191.4 parts of 2-methylpentanoic acid, 316.8 parts of 2-ethylhexanoic acid, and 254 parts of dipentaerythritol. In the reaction flask there is also introduced, 20 parts of finely divided activated charcoal and heating is applied until the temperature reaches the range of 200° to 210° C. where it is maintained for 26 hours. There are collected 108 parts of water. The hydroxyl number is found to be 0.2. Vacuum is applied to a pressure of 0.2 mm. of mercury while the temperature of the reaction mass is maintained at 190° C. Excess mixture of acid is stripped off. After two hours, the acid number is 0.02. The batch is vented and the ester product is collected by filtration.

EXAMPLE 13

Following a similar procedure, there is prepared the dipentaerythritol ester of isobutyric acid, 290.4 parts, and 2-methylpentanoic acid, 352.8 parts. There is used 4 parts of activated charcoal which are introduced to the esterification mixture having a hydroxyl number of 1 and being at a temperature of 100° C. Excess acid is stripped off at a pressure of 1 mm. of mercury and heating at 180° to 200° C. The ester product is a very useful plasticizer.

EXAMPLE 14

449 parts of 2-methylbutyric acid and 317 parts of caprylic acid are esterified with 254 parts of dipentaerythritol until the reaction temperature has reached 240° C. after 35 hours of reaction. At this point, the hydroxyl number is 0.1. After cooling to 100° C., there is added 2 parts of activated charcoal. Vacuum is applied to reduce and hold the pressure at 10 mm. of mercury absolute. Excess acid starts to distill as the pressure approaches 10 mm. The temperature is raised to 240° C. and held until a test sample has an acid number below 0.2. The carbon is removed by filtration and the product has an acid number of 0.14.

EXAMPLE 15

Following essentially the same procedure as in Example 14 there are prepared the following esters from 254 parts of dipentaerythritol:

a. A mixture of 449 parts of 2-methylbutyric acid and 317 parts of 2-ethylhexanoic acid.

b. A mixture of 269 parts of 2-methylbutyric, 180 parts of n-pentanoic and 317 parts of 2-ethylhexanoic acids.

c. A mixture of 393 parts of 2-methylbutyric acid and 396 parts of 2-ethyl-4-methylpentanoic acid.

d. A mixture of 457 parts of 2-methylbutyric acid and 305 parts of 2-ethyl-4-methylpentanoic acid.

In all these instances, when the esterification has proceeded to give a hydroxyl number of 5 or less and generally when it is about 1.0, heating is discontinued and when the mixture of reactants is cooled to about 120° C., there is introduced about 8 parts of activated charcoal. Then, while heat is gradually applied, the pressure is reduced and maintained at 10 mm. and preferably below 5, acid being striped off until the acid number gives a reading of 0.1 and generally until it is in the range of 0.1 to 0.05.

We claim:

1. An esterification process which comprises reacting (a) at least one member of the class consisting of pentaerythritol and polypentaerythritols averaging to tripentaerythritol with (b) an excess of an acid component from the class consisting of a branched alkanoic acid containing six carbon atoms and a mixture of alkanoic acids, each acid in said mixture having a content of 4 to 8 carbon atoms, said mixture of acids further having an average content of 5 to 6.5 carbon atoms and containing from about 50 to about 100 percent by weight of branched acid component to the total alkanoic acid mixture, by heating within a temperature range of about 120° to about 240° C. and in the presence of activated carbon until the reaction mixture has a hydroxyl number not exceeding about 5.0, stripping said reaction mixture by heating within said temperature range under a reduced pressure not exceeding 80 mm. of mercury until there is obtained a product having an acid number not exceeding 0.5, and isolating said product.

2. An esterification process which comprises reacting (a) at least one member of the class consisting of pentaerythritol and polypentaerythritols averaging to tripentaerythritol with (b) an excess of an acid component from the class consisting of a branched alkanoic acid containing six carbon atoms and a mixture of alkanoic acids, each acid in said mixture having a content of 4 to 8 carbon atoms, said mixture of acids further having an average content of 5 to 6.5 carbon atoms and containing from about 50 to about 100 percent by weight of branched acid component to the total alkanoic acid mixture, by heating within a temperature range of about 150° to 220° C. and in the presence of activated carbon until the reaction mixture has a hydroxyl number not exceeding about 1.0, stripping said reaction mixture by heating within said temperature range under a reduced pressure not exceeding 10 mm. of mercury until there is obtained a product having an acid number not exceeding 0.2, and isolating said product.

3. An esterification process which comprises reacting (a) at least one member of the class consisting of pentaerythritol and polypentaerythritols averaging to tripentaerythritol with (b) An excess of an acid component from the class consisting of a branched alkanoic acid containing six carbon atoms and a mixture of alkanoic acids, each acid in said mixture having a content of 4 to 8 carbon atoms, said mixture of acids further having an average content of 5 to 6.5 carbon atoms and containing from about 50 to about 100 percent by weight of branched acid component to the total alkanoic acid mixture, by heating within a temperature range of about 180° to 220° C. and in the presence of activated carbon until the reaction mixture has a hydroxyl number in the range of 1.0 to 0, stripping said reaction mixture by heating within said temperature range under a reduced pressure not exceeding 10 mm. of mercury until there is obtained a product having an acid number not exceeding 0.1, and isolating said product.

4. An esterification process which comprises reacting at least one member of the class consisting of pentaerythritol and a mixture of polypentaerythritols averaging to dipentaerythritol with an excess of a mixture of alkanoic acids, each acid in said mixture having a content of 4 to 8 carbon atoms, said mixture of acids further having an average content of 5 to 6.5 carbon atoms and containing from about 50 to about 100 percent by weight of branched acid component to the total alkanoic acid mixture, by heating within a temperature range of about 150° to 220° C. and in the presence of activated carbon until the reaction mixture has a hydroxyl number not exceeding about 1.0, stripping said reaction mixture by heating within said temperature range under a reduced pressure not exceeding 10 mm. of mercury until there is obtained a product having an acid number not exceeding 0.2, and isolating said product.

5. An esterification process which comprises reacting at least one member of the class consisting of pentaerythritol and a mixture of polypentaerythritols averaging to dipentaerythritol with an excess of a branched alkanoic acid containing six carbon atoms, by heating within a temperature range of about 150° to 220° C. and in the presence of activated carbon until the reaction mixture has a hydroxyl number not exceeding about 1.0, stripping said reaction mixture by heating within said temperature range under a reduced pressure not exceeding 10 mm. of mercury until there is obtained a product having an acid number not exceeding 0.2, and isolating said product.

6. An esterification process which comprises reacting (a) at least one member of the class consisting of pentaerythritol and polypentaerythritols averaging to tripentaerythritol with (b) an excess of an acid component from the class consisting of a branched alkanoic acid containing six carbon atoms and a mixture of alkanoic acids, each acid in said mixture having a content of 4 to 8 carbon atoms, said mixture of acids further having an average content of 5 to 6.5 carbon atoms and containing from about 50 to about 100 percent by weight of branched acid component to the total alkanoic acid mixture, by heating within a temperature range of about 120° to about 240° C. until the reaction mixture has a hydroxyl number not exceeding about 5.0, adding activated carbon to said reaction mixture, stripping said reaction mixture by heating within said temperature range under a reduced pressure not exceeding 80 mm. of mercury until there is obtained a product having an acid number not exceeding 0.5, and isolating said product.

7. An esterification process which comprises reacting (a) at least one member of the class consisting of pentaerythritol and polypentaerythritols averaging to tripentaerythritol with (b) an excess of an acid component from the class consisting of a branched alkanoic acid containing six carbon atoms and a mixture of alkanoic acids, each acid in said mixture having a content of 4 to 8 carbon atoms, said mixture of acids further having an average content of 5 to 6.5 carbon atoms and containing from about 50 to about 100 percent by weight of branched acid component to the total alkanoic acid mixture, by heating within a temperature range of about 180° to 220° C. until the reaction mixture has a hydroxyl number not exceeding about 1.0, adding activated carbon to said reaction mixture, striping said reaction mixture by heating within said temperature range under a reduced pressure not exceeding 10 mm. of mercury until there is obtained a product having an acid number not exceeding 0.2, and isolating the product.

8. An esterification process which comprises reacting (a) at least one member of the class consisting of pentaerythritol and polypentaerythritols averaging to tripentaerythritol with (b) an excess of an acid component from the class consisting of a branched alkanoic acid containing six carbon atoms and a mixture of alkanoic acids, each acid in said mixture having a content of 4 to 8 carbon atoms, said mixture of acids further having an average content of 5 to 6.5 carbon atoms and containing from about 50 to about 100 percent by weight of branched acid component to the total alkanoic acid mixture, by heating within a temperature range of about 180° to 220° C. until the reaction mixture has a hydroxyl number in the range of 1.0 to 0, adding activated carbon to said reaction mixture, stripping said reaction mixture by heating within said temperature range under a reduced pressure not exceeding 10 mm. of mercury until there is obtained a product having an acid number not exceeding 0.1, and isolating said product.

9. An esterification process which comprises reacting at least one member of the class consisting of pentaerythritol and a mixture of polypentaerythritols averaging to dipentaerythritol with an excess of a mixture of alkanoic acids, each acid in said mixture having a content of 4 to 8 carbon atoms, said mixture of acids further having an average content of 5 to 6.5 carbon atoms and containing from about 50 to about 100 percent by weight of branched acid component to the total alkanoic acid mixture, by heating within a temperature range of about 120° to about 240° C. until the reaction mixture has a hydroxyl number not exceeding about 5.0, adding activated carbon to said reaction mixture, stripping said reaction mixture by heating within said temperature range under a reduced pressure not exceeding 80 mm. of mercury until there is obtained a product having an acid number not exceeding 0.5, and isolating said product.

10. An esterification process which comprises reacting at least one member of the class consisting of pentaerythritol and a mixture of polypentaerythritols averaging to dipentaerythritol with an excess of a branched alkanoic acid containing six carbon atoms by heating within a temperature range of about 180° to about 220° C. until the reaction mixture has a hydroxyl number not exceeding about 1.0, adding activated carbon to said reaction mixture, stripping said reaction mixture by heating within said temperature range under a reduced pressure not exceeding 10 mm. of mercury until there is obtained a product having an acid number not exceeding 0.1, and isolating said product.

11. An esterification process which comprises reacting dipentaerythritol and 2-methylpentanoic acid by heating within a temperature range of about 180° to 220° C. until the reaction mixture has a hydroxyl number within the range of 1 to 0, adding activated carbon to said reaction mixture, stripping said reaction mixture by heating within said temperature range under reduced pressure not exceeding 10 mm. of mercury until there is obtained a product having an acid number not exceeding 0.1, and isolating said product.

12. An esterification process which comprises reacting dipentaerythritol with a mixture of 2-methylbutyric acid and caprylic acid, said acids being in a mixture averaging 6 carbon atoms, by heating within a temperature range of about 180° to 220° C. until the reaction mixture has a hydroxyl number within the range of 1 to 0, adding activated carbon to said reaction mixture, stripping said reaction mixture by heating within said temperature range under reduced pressure not exceeding 10 mm. of mercury until there is obtained a product having an acid number not exceeding 0.1, and isolating said product.

13. An esterification process which comprises reacting dipentaerythritol and 2-ethylbutyric acid by heating within a temperature range of about 180° to 220° C. until the reaction mixture has a hydroxyl number within the range of 1 to 0, adding activated carbon to said reaction mixture, stripping said reaction mixture by heating within said temperature range under reduced pressure not exceeding 10 mm. of mercury until there is obtained a product having an acid number not exceeding 0.1, and isolating said product.

14. A process for treating a partially esterified reaction mixture of (a) at least one member of the class consisting of pentaerythritol and polypentaerythritols averaging to tripentaerythritol and (b) an excess of an acid component from the class consisting of a branched alkanoic acid containing six carbon atoms and a mixture of alkanoic acids, each acid in said mixture having a content of 4 to 8 carbon atoms, said mixture of acids further having an average content of 5 to 6.5 carbon atoms, and being further characterized by containing from about 50 to about 100 percent by weight of branched acid component to the total alkanoic acid mixture, and said reaction mixture having a hydroxyl number not exceeding about 5.0, which comprises adding activated carbon to said reaction mixture, stripping said reaction mixture by heating it within a temperature range of about 120° to about 240° C. under a reduced pressure not exceeding 80 mm. of mercury until there is obtained a product having an acid number not exceeding about 0.5, and isolating said product.

15. A process for treating a partially esterified reaction mixture of (a) at least one member of the class consisting of pentaerythritol and a mixture of polypentaerythritols averaging to dipentaerythritol and (b) an excess of a branched alkanoic acid containing six carbon atoms, said reaction mixture having a hydroxyl number in the range of 1.0 to 0, which comprises adding activated carbon to said reaction mixture, stripping said reaction mixture by heating it within a temperature range of about 180° to 220° C. under a reduced pressure not exceeding 10 mm. of mercury until there is obtained a product having an acid number not exceeding about 0.1, and isolating said product.

16. A process for treating a partially esterified reaction mixture of (a) at least one member of the class consisting of pentaerythritol and a mixture of polypentaerythritols averaging to dipentaerythritol and (b) an excess of a mixture of alkanoic acids, each acid in said mixture having a content of 4 to 8 carbon atoms, said mixture of acids further having an average content of 5 to 6.5 carbon atoms and containing from about 50 to about 100 percent by weight of branched acid component to the total alkanoic acid mixture, said reaction mixture having a hydroxyl number not exceeding about 5.0, which comprises adding activated carbon to said reaction mixture, stripping said reaction mixture by heating it within a temperature range of about 120° to about 240° C. under a reduced pressure not exceeding 80 mm. of mercury until there is obtained a product having an acid number not exceeding about 0.5 and isolating said product.

References Cited in the file of this patent

UNITED STATES PATENTS

| | | |
|---|---|---|
| 2,031,603 | Holt | Feb. 25, 1936 |
| 2,776,984 | Mention et al. | Jan. 8, 1957 |